May 19, 1942.  E. W. FLOSDORF ET AL  2,283,867
PACKAGING AND PRESERVING DRIED BIOLOGICALS,
PHARMACEUTICALS, AND THE LIKE
Filed Dec. 19, 1939
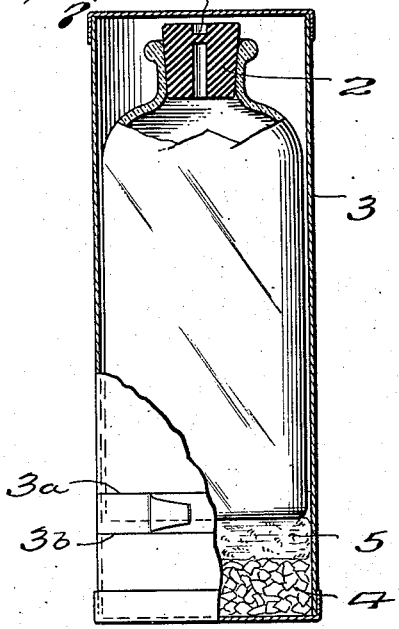
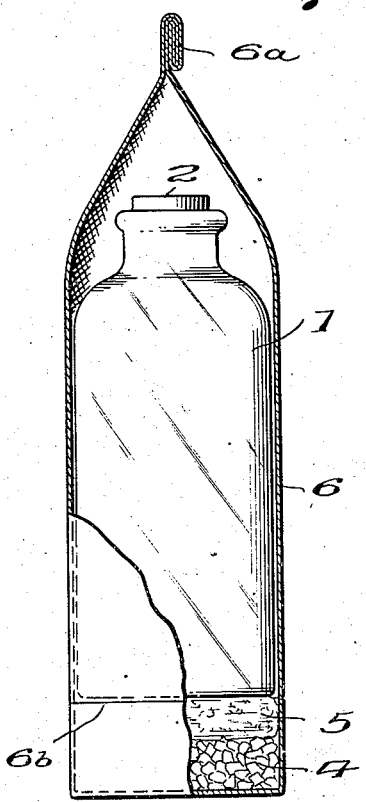
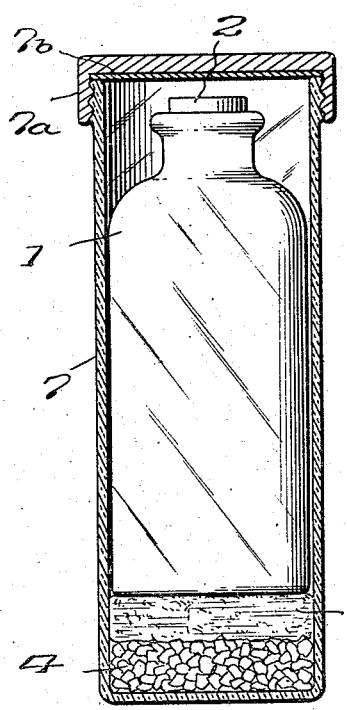
Inventors
Earl W. Flosdorf
Francis J. Spokes, Jr.,
By Ralph B. Stewart
Attorney Patented May 19, 1942

2,283,867

UNITED STATES PATENT OFFICE 2,283,867

PACKAGING AND PRESERVING DRIED BIOLOGICALS, PHARMACEUTICALS, AND THE LIKE

Earl W. Flosdorf, Upper Darby, and Francis J. Stokes, Jr., Chestnut Hill, Pa., assignors to F. J. Stokes Machine Company, a corporation of Pennsylvania Application December 19, 1939, Serial No. 310,060

3 Claims. (Cl. 312—31)

The present invention relates to the art of packaging and preserving dried materials such as sera or other biologics, pharmaceuticals, foods, and the like for use with humans or animals.

Such products must be maintained in a completely dry state in order to maintain their essential qualities and effectiveness, and one of the problems in the past has been that of packaging these products so that they can be stored without losing potency, flavor or solubility. The problem is rendered more difficult due to the fact that these have a low aqueous tension when delicately dried, as for example by drying in the frozen state, and will maintain a low vapor pressure on the inside of any container in which they are stored, and will thereby tend to increase the differential of vapor pressure existing between the inside of the container and the outside.

Heretofore, different methods of storage have been resorted to for preserving dried sera and the like. One method is to place the dried material within a small glass vial or bottle which is sealed with a rubber stopper. This method of packaging is satisfactory for short periods of time, but we have discovered that due to the fact that rubber is permeable to moisture, it is not satisfactory where the material is to be stored for a long period of time. Furthermore, since the permeability of rubber to moisture varies with the temperature and humidity of the atmosphere, the effectiveness of this method of packaging will vary materially according to the different climatic conditions. In the tropics the containers of dry serum may be exposed to a high temperature at high relative humidities. In other regions, the temperature may be high, but the air relatively dry. Furthermore, in order to make the contents readily usable by the physician for aseptic injection into humans or animals it is customary to have a section of said stopper made very thin so that it can be pierced readily by the needle of a syringe without dulling, bending, or breaking the needle. This results in the stopper being even more permeable than it otherwise would be. No compounds of rubber, or of synthetic rubbers, and no coatings for the stopper have been found which effectively reduce this permeability. The matter is made even worse by the fact that the degree of permeability varies widely with the conditions of temperature and relative humidity under which the package has been stored and at any given time the physician using any particular package does not know how the package had been stored previously and there is no way in which he can test the contents before using them. There is no way in which he can determine if there has been excessive permeation with consequent deterioration of the contents before administering them. Furthermore, occasionally small pin-hole leaks occur in the glass itself which is as bad in effect as that of permeation through the rubber.

It had also been the practice to package dried sera in all-glass ampoules which are hermetically sealed by fusion of the glass at one end. However, such ampoules are expensive to make and to seal as well as being difficult to use by the physician. Under conditions of use (which is seldom in a laboratory) the scratching and breaking of the glass followed by withdrawal of the contents aseptically into a syringe is not easy or fully satisfactory. Another variation of such an all-glass ampoule hermetically sealed by fusion of the glass has been developed which carries a rubber stopper within the hermetically sealed neck of the container. This does eliminate the permeation through the rubber stopper, but such containers are exceedingly expensive to make and to seal and yet they do not remove the necessity of cracking and breaking of glass by the physician. Furthermore, none of these types of all-glass packages, hermetically sealed by fusion of glass, avoids the condition of occasional leaks in certain of the containers and, consequently, in using them the physician is trusting to chance that the contents of the package have not deteriorated. Furthermore, none of these packages are sufficiently low in cost and simple enough to use by a non-professional person to be applicable for use with food products in ordinary commerce and trade.

An object of the present invention is to produce a low cost and readily usable package of dried or desiccated materials adapted to be sold as an article of commerce and which will permanently protect the contents from atmospheric moisture regardless of the climatic conditions in which the package may be stored.

A further object is to produce a package for the storage of dried materials and embodying a moisture indicator integral therewith so that upon opening the package, it will be possible to know immediately if there is any defect in the individual package, such as would cause possible deterioration of the contents of the package.

Still another object is to package dried sera in a primary container especially suitable for use by the physician, and to enclose the primary container in a moisture impervious secondary container which will protect the sera from moisture leakage through any small defects in the primary container. Our invention also aims to protect the material from the effects of moisture which may be entrapped in the secondary container.

Our invention may be described in connection with the accompanying drawing in which:

Fig. 1 is a view, partly in section, illustrating one form of package according to our invention, employing a secondary container formed according to the usual metal can construction;

Fig. 2 illustrates a second form of package in which the secondary container assumes the form of a sealed collapsible tube; and Fig. 3 is a view in elevation of a third form of package in which the secondary container is formed of a glass jar or bottle, provided with a screw-cap closure.

In practicing our invention, the dried material to be packaged and preserved is first placed within a primary container 1 which is especially formed to facilitate use of the material by the physician. In the preferred form of our invention, the container 1 comprises the usual aseptic vial or bottle which is stoppered by a vaccine stopper 2 having a section 2a of reduced thickness which may be punctured by the needle of a hypodermic syringe, whereby sterile water may be aseptically introduced into the container and the resulting solution withdrawn from the container through the needle. Usually the stopper 2 is formed of rubber or synthetic rubber compounds which are permeable to moisture to such an extent that under usual atmospheric conditions sufficient moisture will, in time, permeate the material of the stopper and spoil the serum within the container 1. By employing this standard primary container, the physician is not required to learn any new technique in administering the serum.

The stoppered primary container 1 is placed within a secondary container 3 which is impervious to moisture. In Fig. 1 the secondary container is formed of a metal can or tube, the ends of which are hermetically sealed in the usual fashion. It has been found by long systematic experimentation that such cans or tubes contain moisture, adsorbed on the inner walls, in the seams, and otherwise, which is sufficient in amount to cause deterioration of the contents of the primary container 1. Such residual moisture is difficult to remove completely, except by baking beforehand which in itself is otherwise injurious to the seams of the secondary container. In order to prevent the injurious effect of this entrapped moisture when baking is not resorted to, a desiccant 4 is placed within the secondary container before final sealing of the container with its contents of biologicals or pharmaceuticals. This serves to remove the moisture contained in the air space within the secondary container or released from the inner walls and seams of the secondary container. Preferably, a layer of cotton 5 is inserted between the primary container 1 and the desiccant 4. It is necessary to use a desiccant which has no acid or other deleterious vapors associated with it, not only because of an undesirable action on the secondary container, but also because many biologicals and pharmaceuticals are susceptible to the action thereof. It has been found preferable to use a chemically inert desiccant such as anhydrous calcium sulphate which is of the fixed chemical hydrate type, but, by using appropriately larger quantities, the adsorption type may also be used, such as silica gel or alumina. Other desiccants of the former type are magnesium and barium perchlorates. It is further of value to use a desiccant which is non-deliquescent in order to avoid a corrosive effect on the secondary container. Also one which is highly porous and not like phosphoric anhydride which becomes coated over on the surface with meta phosphoric acid with a serious loss of efficiency. Anhydrous calcium sulphate properly meets all these requirements and has been found to be fully satisfactory even with storage of the highly labile complement of the serum of guinea pigs.

The amount of desiccant to be enclosed within the secondary container should be approximately double that required to absorb all the moisture likely to be present, and in the case of anhydrous calcium sulphate in containers of a size appropriate to accommodate a maximum of solids from 20 ML. of serum, the amount of desiccant required will be from two-tenths to five grams.

In sealing the secondary container, it is hermetically sealed, either filled with air or in an evacuated condition, or filled with an inert gas such as argon or nitrogen, but preferably in the same condition as the stoppered primary container which contains the dried material. Where the primary container is stoppered with a plug or stopper formed of a material which is more permeable to moisture than rubber, it would be advantageous to seal the secondary container in an evacuated condition to accelerate removal of all moisture to the desiccant. This is especially true where the dried material is a highly labile substance such as the complement of the serum of guinea pigs. Also, in such case, the desiccant is used to complete the desiccation of the materials being stored to below a level that otherwise is difficult to attain by ordinary processes of desiccation, that is to less than 0.06%, which has been found to materially lengthen the duration or potency of biological activity of such a labile material as the complement of guinea pig serum. Whereas otherwise eight to fourteen months was the limit of such duration, we have been able to extend it to more than three years when dried to this low level.

In actual experience it has been found that the outer cans or tubes may be sealed hermetically with virtually 100% of no leaks, or at least with a percentage of no leaks far in excess of the number of glass containers in many batches that are found to be properly devoid of small pin-holes. Nevertheless, in order to have positive evidence for the physician using any particular package that no deterioration of product has occurred due to an individual faulty package, a moisture indicator is incorporated within the secondary container. Certain cobalt salts are well-known in their characteristics for this purpose, and these may be incorporated within the secondary container in a separate condition or in intimate mixture with the desiccant. In either case, the color of the indicator material is blue when anhydrous and red when not. Accordingly, when the secondary container is opened for use, if it is found that no blue color remains, and all of the indicator has turned red, it is immediately evident that the capacity of the desiccant for removal of moisture has been exceeded. Inasmuch as sufficient desiccant has been included within the package to remove all moisture normally present, the conclusion is that there is a leak in the secondary container and that infiltration of moisture from without has occurred. Accordingly, the value of the biologicals or pharmaceuticals contained in the package is in doubt and the contents should not be used. In this fashion, it is apparent that it matters not if there are pin holes in the inner glass vessel, and if a leaky outer container occurs, it will not go undetected before use.

While in the preferred form of our invention a desiccant is included within the secondary container for the purpose of maintaining a dry atmosphere surrounding the primary container, the desiccant need not be included where the secondary container is thoroughly baked or otherwise treated to remove all entrapped moisture from the inner walls and seams, and is then sealed in a dry atmosphere of air or inert gas, such as nitrogen or helium, or is sealed under vacuum.

All operations in the use of the package described so far are familiar and simple, particularly with respect to use of the syringe needle in piercing the standard rubber stopper which can be made of soft rubber and thin, irrespective of how permeable it might be. Provision may be made for opening the secondary container by any known procedure. For example, the container may be provided with a frangible or severable portion included between the lines 3a—3b adjacent the bottom end of the primary container 1, and the usual can opening key may be supplied with the container 3 for removing the severable portion from the container. It will be seen that the strip 3a—3b is located so that when the container 3 is opened, the primary container 1 projects beyond the open end of container 3 and may be easily withdrawn from the larger portion of container 3. The smaller portion of container 3 forms a shallow receptacle for retaining the desiccant and the moisture indicator. This arrangement facilitates inspection of the desiccant and moisture indicator upon opening of the package.

Unit clinical doses or multiples thereof may be packed in one package. In the case of multiple doses, all need not be included within a single primary container. An ampoule of water for restoration of the desiccated product may also be included within the package, but if so, it must be sealed in an all-glass ampoule.

In the package illustrated in Fig. 2, the secondary container 6 comprises a collapsible tube preferably formed of a single piece of tinfoil, although it might be formed of lead or aluminum foil. The tube 6 is preferably seamless and is closed at the upper end by a folded and crimped seal 6a. We prefer to form the seal 6a as a cemented seal in accordance with the teaching of U. S. patent to Westin No. 2,028,112. Also, while being folded at the end, the tube is preferably supported around the outside for most of its length as in the patent to Westin No. 2,053,015. This prevents the tube from flattening out and pinching the inner container. For the purpose of opening the secondary container, it may be scored as at 6b adjacent the lower end of primary container 1. The container 6 may be sufficiently thin along the scoring 6b to permit opening of the container by simply running the thumbnail along the scoring.

In the form of package illustrated in Fig. 3, the secondary container 7 comprises a glass bottle or jar provided with a screw-cap 7a, the mouth of the container 7 being sufficiently large to permit withdrawal of the primary container 1 therethrough. Container 7 is hermetically sealed by a suitable gasket 7b.

While we have described the principle of our invention and illustrated a number of embodiments thereof, it will be obvious to those skilled in the art that various modifications may be made within the scope of our invention. For example, the relative positions of the primary container and the desiccant within the secondary container 3 may be reversed or changed from that shown in the drawing. Also, various other methods of sealing and opening the secondary container may be employed if desired.

What we claim is:

1. An article of manufacture comprising a package including an aseptic inner container containing desiccated biologically active material which is subject to deterioration by moisture, said inner container being formed entirely of liquid-impermeable material and having at least a portion thereof formed of material puncturable by a hypodermic needle and permeable to water vapor, and a metallic water vapor impermeable outer container hermetically enclosing the inner container.

2. A package for desiccated biologically active material comprising in combination, an aseptic vial forming a primary container for said material and having a vaccine stopper permeable to moisture, a tubular outer container formed of moisture impervious material hermetically enclosing said vial, a quantity of desiccating material located in one end of said outer container and a wad of porous material interposed between said vial and said desiccating material, said outer container being formed with a frangible section adjacent said wad of porous material whereby said outer container may be opened at an intermediate section, the vial being retained in one end section while the desiccating material is retained in the other end section.

3. A package according to claim 2 wherein the frangible section of said outer container comprises a separable section located at the end of the vial adjacent the wad of porous material and being so positioned that upon being removed therefrom, the primary container projects beyond the open end of the end section containing said vial.

EARL W. FLOSDORF.
F. J. STOKES, Jr.